(12) United States Patent
Kim

(10) Patent No.: US 7,460,203 B2
(45) Date of Patent: Dec. 2, 2008

(54) LIQUID CRYSTAL DISPLAY DEVICE

(75) Inventor: Seok Su Kim, Gyeongsangbuk-do (KR)

(73) Assignee: LG.Philips LCD Co., Ltd, Seoul (KR)

( * ) Notice: Subject to any disclaimer, the term of this patent is extended or adjusted under 35 U.S.C. 154(b) by 387 days.

(21) Appl. No.: 11/475,910

(22) Filed: Jun. 28, 2006

(65) Prior Publication Data

US 2007/0085960 A1    Apr. 19, 2007

(30) Foreign Application Priority Data

Oct. 14, 2005    (KR) .................. 10-2005-0097130

(51) Int. Cl.
*G02F 1/1345*    (2006.01)
(52) U.S. Cl. ............... 349/149; 349/139; 349/152
(58) Field of Classification Search .......... 349/139, 349/141, 143–152
See application file for complete search history.

(56) References Cited

U.S. PATENT DOCUMENTS

2005/0140632 A1* 6/2005 Tsuda et al. ............... 345/92
2007/0182909 A1* 8/2007 Kim et al. .................. 349/149

* cited by examiner

*Primary Examiner*—Hemang Sanghavi
(74) *Attorney, Agent, or Firm*—Holland & Knight LLP

(57) ABSTRACT

A liquid crystal display device with a liquid crystal layer disposed between first and second substrates in which the first substrate is divided into an active region and a pad region outside the active region that includes: gate lines and data lines crossing each other to define pixels in the active region of the first substrate; a thin film transistor and a pixel electrode in each of the pixels; common lines parallel to the gate lines in the active region; gate pads in the pad region, the gate pads electrically connected to the gate lines; data pads in the pad region, the data pads electrically connected to the data lines; a common electrode along an edge of the active region and electrically connected with the common lines; an insulation film over the common electrode; and a distortion preventing electrode overlapping the common electrode with the insulation film interposed therebetween for creating a capacitance.

39 Claims, 12 Drawing Sheets

LIQUID CRYSTAL DISPLAY DEVICE

This application claims the benefit of Korean Patent Application No. P2005-97130, filed on Oct. 14, 2005, which is hereby incorporated by reference in its entirety.

BACKGROUND OF THE INVENTION

1. Field of the Invention

The present invention relates to a display device, and more particularly, to a liquid crystal display (LCD) device. Although the present invention is suitable for a wide scope of applications, it is particularly suitable for stabilizing signals on a common voltage line in a pad region of the LCD device.

2. Discussion of the Related Art

In general, the liquid crystal display (LCD) device is a flat panel display device that has been actively researched due its advantages of high contrast ratio, desirable color display capacity and fast response time for displaying moving images. The LCD device has a lighter weight than a cathode ray tube (CRT) monitor and is also thinner than a cathode ray tube (CRT) monitor. Thus, an LCD device can be a display panel for use in a wall-mounted TV. In another example, an LCD device can be used as a display panel in a notebook computer powered by a battery due to its light weight, thin profile and low power consumption. Further, an LCD device can be manufactured to be a compact size, such as a miniature display panel for a mobile phone. The LCD device has a variety of applications due to its light weight, thin profile, low power consumption and scalability down to a compact size.

The LCD device includes an upper substrate, which is often referred to as a color filter layer array substrate, a lower substrate, which is often referred to as a TFT array substrate, and a layer of liquid crystal molecules disposed between the upper and lower substrates. Each of the upper and lower substrates can have an alignment film formed on an inner surface thereof. The alignment film has a pattern to orient the liquid crystal molecules in a predetermined direction. A related art liquid crystal display device will be described in detail with reference to FIG. 1 and FIG. 2.

FIG. 1 is a plan view of the related art liquid crystal display device, and FIG. 2 is a plan view illustrating a portion of a pad region of the related art liquid crystal display device shown in FIG. 1. An upper substrate (not shown) of the LCD device includes a black matrix (not shown) to prevent light leakage and a color filter layer (not shown) having red, green and blue color filters. As shown in FIG. 1, a lower substrate 11 is divided into an active region 11a (area inside the dotted line shown in FIG. 1) and a pad region 11b (area outside the dotted line shown in FIG. 1).

The active region 11a is a region on which an image is displayed. The active region 11a includes gate lines 12 crossing data lines 15 to define pixel regions. Common lines 17 also cross the data lines 15. Thin film transistors (not shown) are formed in each pixel region adjacent to where one of the gate lines 12 for the pixel region and one of the data lines 15 for the pixel region cross. In addition, pixel electrodes (not shown) are formed in each of the pixel regions and connected to the thin film transistors in each of the pixel region.

The pad region 11b includes gate pads 22 respectively connected to the gate lines 12, data pads 25 respectively connected to the data lines 15, and a common electrode 27 commonly connected to the common lines 17. The gate pads 22, the data pads 25 and the common electrode 27 receive signals from a printed circuit board (not shown) acting as a driving circuit.

As shown in FIG. 2, the lower substrate 11 has the gate lines 12 and the data lines 15 crossing each other to define pixels of red (R), green (G) and blue (B). Each of the pixels includes the thin film transistor acting as a switching element to apply a pixel voltage to the pixel electrode connected with the thin film transistor. The common lines 17 are parallel to the gate lines 12. Each gate pad 22 is integrally formed with a corresponding gate line 12 in a gate pad region G/P, and each data pad 25 is integrally formed with a corresponding data line 15 in a data pad region D/P. The common electrode 27 is connected to all of the common lines 17 in the gate pad region G/P. To prevent a short circuit with the gate lines, the common electrode 27 is in a different layer from the gate lines inside the gate pad region G/P, and is electrically connected with the common lines 17 via contact holes 30. The common lines 17 are in the same layer as the gate lines 12.

A data signal is applied to the data lines 15 via the data pads 25 and a $V_{com}$ signal for supplying a reference voltage for the data signal is applied to the common electrode 27. However, such a related art liquid crystal display device has interference problems between the data signal and the $V_{com}$ signal. The data signal $V_{data}$ is supplied as an AC signal. The common signal $V_{com}$ is supplied as a DC signal. Because the data lines having an AC signal overlap the common electrode, the AC signal in the data lines can cause a voltage ripple or distortion in the DC signal of the common lines. This voltage ripple or distortion of the Vcom-signal causes a ripple of the voltage gap between the pixel voltage and Vcom, and the ripple causes flickering of the images and/or greenish phenomena in the images.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device that prevents distortion of the $V_{com}$ signal.

Another object of the present invention to provide a liquid crystal display device that having a stable $V_{com}$ signal.

Another object of the present invention to provide a liquid crystal display device that has a low resistance in receiving the $V_{com}$ signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device with a liquid crystal layer disposed between first and second substrates in which the first substrate is divided into an active region and a pad region outside the active region that includes: gate lines and data lines crossing each other to define pixels in the active region of the first substrate; a thin film transistor and a pixel electrode in each of the pixels; common lines parallel to the gate lines in the active region; gate pads in the pad region, the gate pads electrically connected to the gate lines; data pads in the pad region, the data pads electrically connected to the data lines; a common electrode along an edge of the active region and electrically connected with the common lines; an insulation film over the common electrode; and a distortion preventing electrode overlapping the common electrode with the insulation film interposed therebetween for creating a capacitance.

In accordance with another aspect of the present invention, there is provided a liquid crystal display device with a liquid crystal layer disposed between first and second substrates in which the first substrate is divided into an active region and a pad region outside the active region that includes: gate lines and data lines crossing each other to define pixels in the active region of the first substrate; a thin film transistor and a pixel electrode in each of the pixels; common lines parallel to the gate lines in the active region; gate pads in the pad region, the gate pads electrically connected to the gate lines; data pads in the pad region, the data pads electrically connected to the data lines; a common electrode along an edge of the active region and electrically connected with the common lines; and a distortion preventing electrode contacting along the common electrode.

In accordance with another aspect of the present invention, a method of fabricating a liquid crystal display device with a liquid crystal layer disposed between first and second substrates in which the first substrate is divided into an active region and a pad region outside the active region, includes: forming gate lines and data lines crossing each other to define pixels in the active region of the first substrate; forming a thin film transistor and a pixel electrode in each of the pixels; forming common lines parallel to the gate lines in the active region; forming gate pads in the pad region, the gate pads electrically connected to the gate lines; forming data pads in the pad region, the data pads electrically connected to the data lines; forming a common electrode along an edge of the active region and electrically connected with the common lines; forming an insulation film over the common electrode; and forming a distortion preventing electrode overlapping the common electrode with the insulation film interposed therebetween for creating a capacitance.

In accordance with another aspect of the present invention, a method of forming a liquid crystal display device with a liquid crystal layer disposed between first and second substrates in which the first substrate is divided into an active region and a pad region outside the active region, includes: forming gate lines and data lines crossing each other to define pixels in the active region of the first substrate; forming a thin film transistor and a pixel electrode in each of the pixels; forming common lines parallel to the gate lines in the active region; forming gate pads in the pad region, the gate pads electrically connected to the gate lines; forming data pads in the pad region, the data pads electrically connected to the data lines; forming a common electrode along an edge of the active region and electrically connected with the common lines; and forming a distortion preventing electrode contacting along the common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
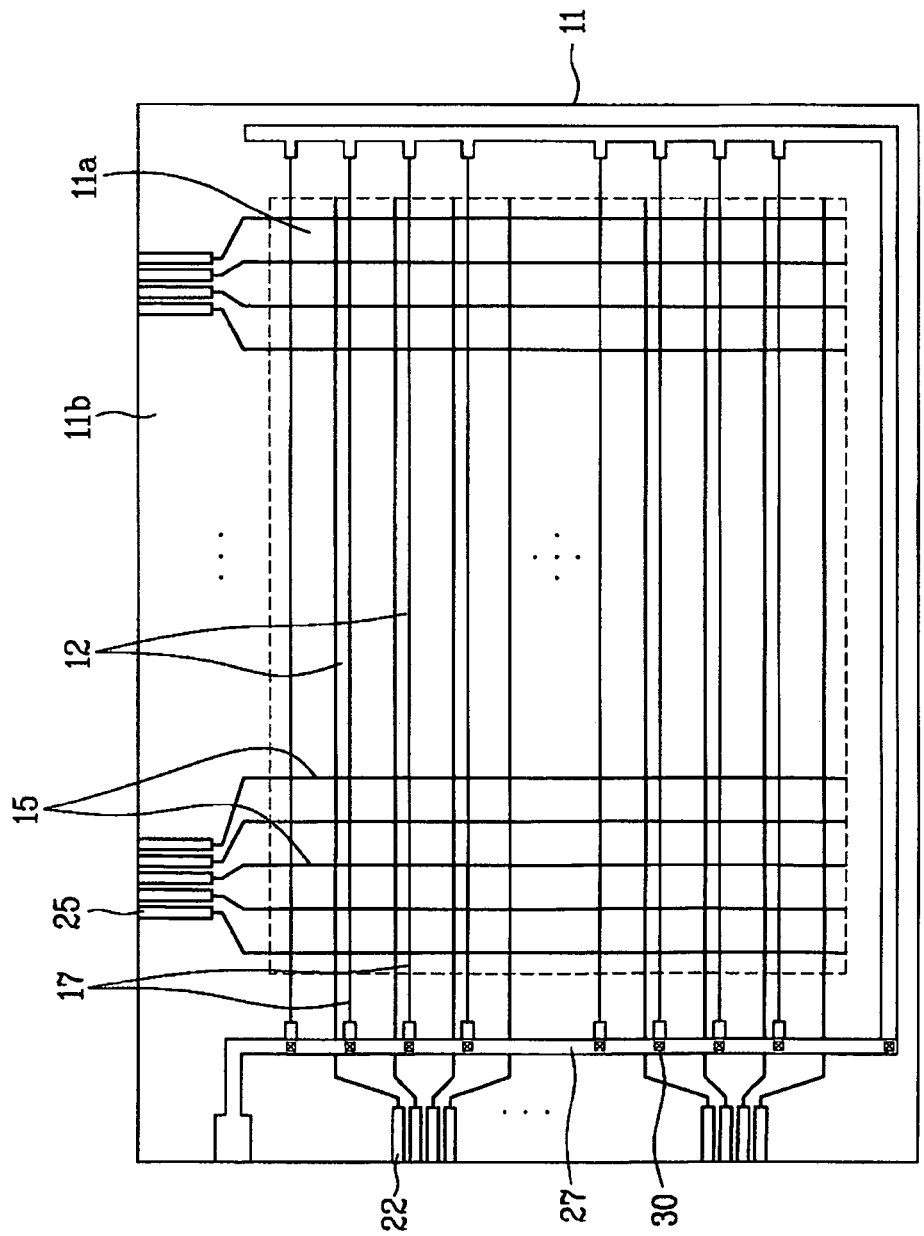
FIG. 1 is a plan view illustrating the related art liquid crystal display device.
Figure 2:
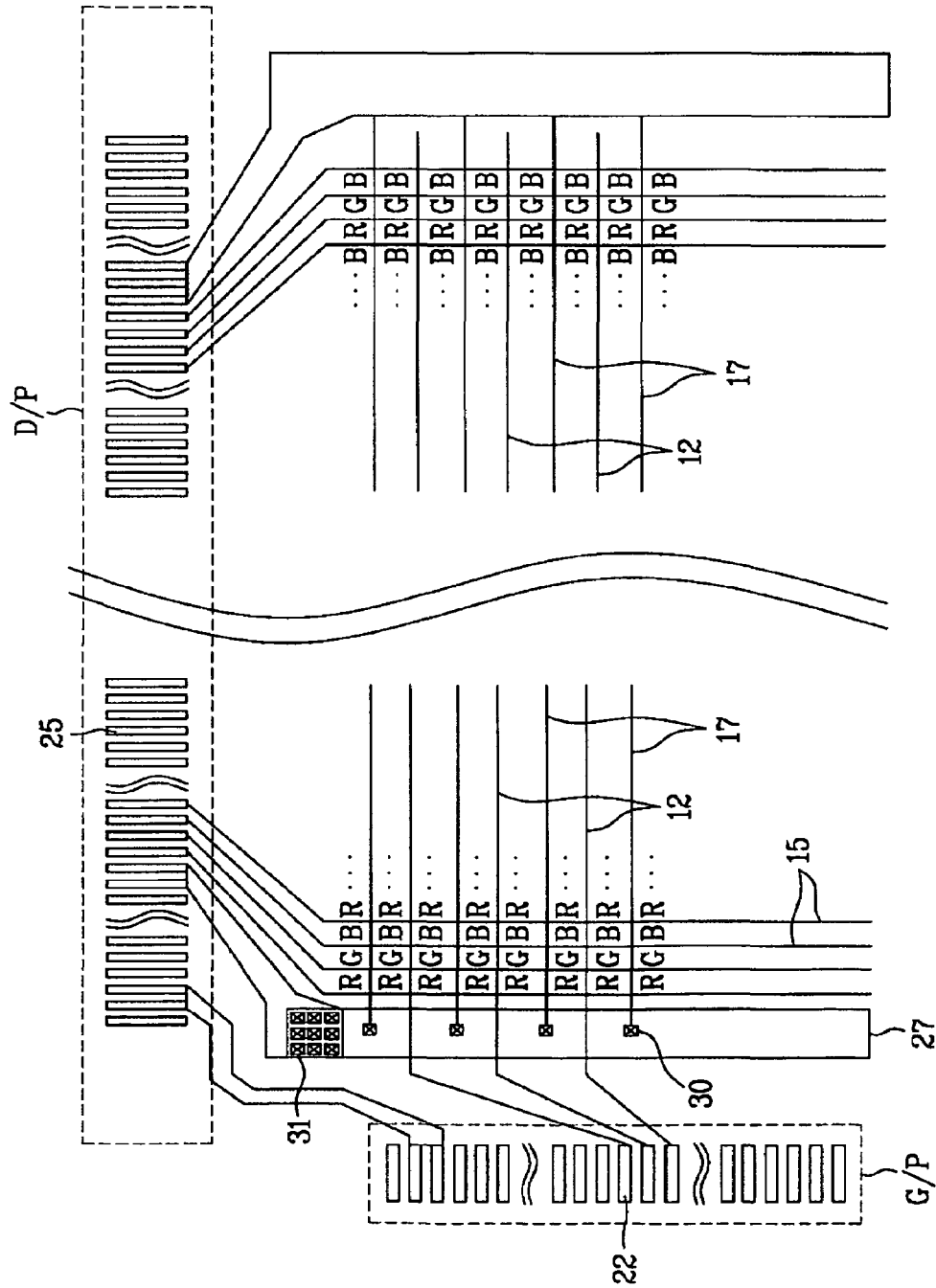
FIG. 2 is a plan view illustrating a pad region of the related art liquid crystal display device.
Figure 3:
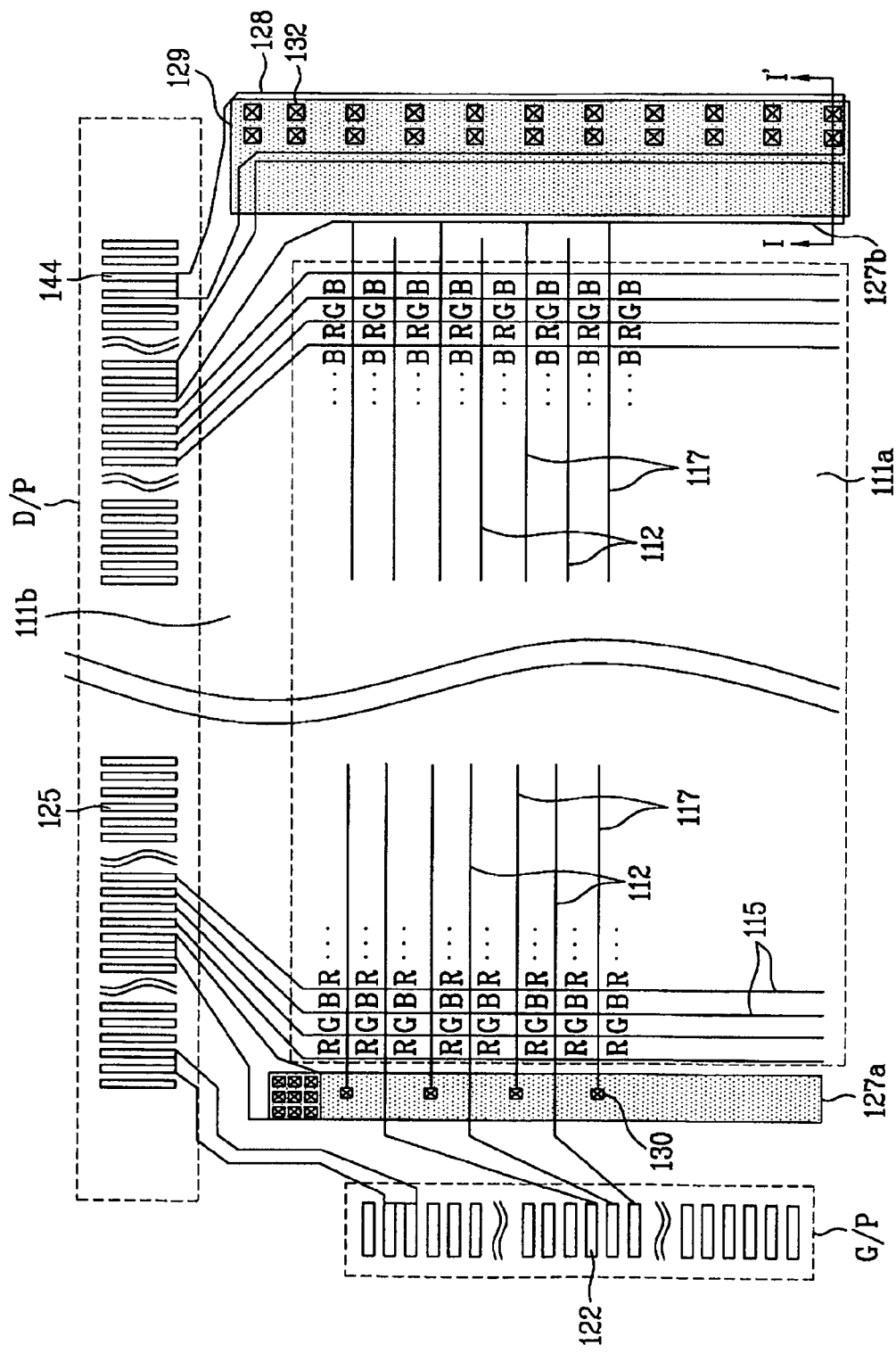
FIG. 3 is a plan view illustrating a pad region of a liquid crystal display device in accordance with a first embodiment of the present invention.
Figure 4:
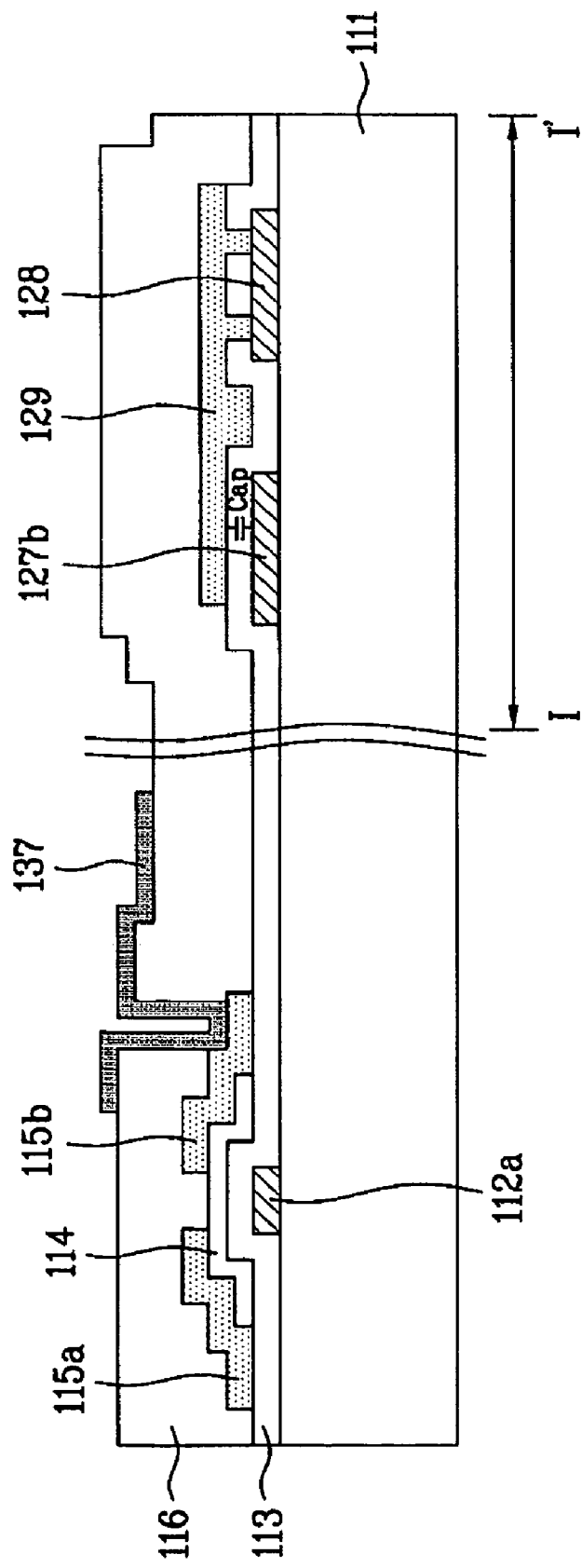
FIG. 4 is a cross-sectional view taken along line I-I' of FIG. 3.

FIG. 3 is a plan view illustrating a pad region of a liquid crystal display device in accordance with a first embodiment of the present invention, and FIG. 4 is a cross-sectional view taken along line I-I' of FIG. 3. In addition, FIGS. 5, 6, 7 and 8 are respectively plan views illustrating a pad region of a liquid crystal display device in accordance with a second, third, fourth and fifth embodiments of the present invention.

Firstly, as shown in FIGS. 3 and 4, a TFT array substrate 111 of the first embodiment of the present invention is divided into an active region 111a in which thin film transistors switch pixel voltages to change an orientation of liquid crystal molecules and a pad region 111b for a connection to an external driving circuit. The active region 111a has gate lines 112 and data lines 115 crossing each other to define pixels of red (R), green (G) and blue (B). Each of the pixels includes a thin film transistor (TFT) acting as a switching element and a pixel electrode 137 penetrating a passivation layer 116 so as to connect with the thin film transistor such that a pixel voltage can be applied thereto. The common lines 117 are in the same layer as the gate lines 112 and are parallel to the gate lines 112.

The thin film transistor includes a gate electrode 112a integrally branching from the gate line 112 for the pixel, a gate insulation layer 113 above the gate electrode 112a, a semiconductor layer 114 on the gate insulation layer 113, and source/drain electrodes 115a/115b overlapping the ends of the semiconductor layer and a portion of the gate insulation layer. The source/drain electrodes 115a/115b are in the same layer as the data line 115 for the pixel. The gate insulation layer 113 is disposed between the gate lines and the data lines to insulate the gate line 112 and data line 115 from each other, and the passivation layer 116 is disposed on the semiconductor layer 114 and the gate insulation layer 113, between the data line 115 and the pixel electrode 137 is connected to the drain electrodes 115b through the contact hole.

If the liquid crystal display device is a TN mode LCD device, the common lines act as a storage electrode in each of their corresponding pixels. Also in the TN mode LCD device, an additional common electrode is on the color filter layer array substrate opposite to the pixel electrode for generating a vertical electric field to drive the liquid crystal molecules. If the LCD device is an IPS mode LCD device, the common lines are formed in parallel to the pixel electrode, generating a horizontal electric field for driving liquid crystals while also serving as a storage electrode in each of their corresponding pixels.

The pad region 111b includes a plurality of gate pads 122 integrally connected to the gate lines 112, a plurality of data pads 125 electrically connected to the data lines 115, a first common electrode 127a formed along a first edge of the pad region 111b and electrically connected with the common lines 117, a second common electrode 127b formed along a second edge of the pad region 111b opposite to the first edge and electrically connected with the common lines 117, and a $V_{com}$ distortion preventing electrode 129 overlapping the second common electrode 127b with an insulation film, such as the gate insulation layer 113, interposed therebetween to form capacitance between the $V_{com}$ distortion preventing electrode 129 and the second common electrode 127b. More specifically, the $V_{com}$ distortion preventing electrode 129 is formed on an edge of the pad region 111b opposite to the edge of the active along which the gate pads 122 are formed. The $V_{com}$ distortion preventing electrode 129 is connected with a ground of a printed circuit board via a wiring pattern, such as a dummy line 128 to dummy pads 144, so as to be grounded with the ground of the printed circuit board. The dummy line 128 is connected to dummy pads 144 in the data pad region D/P.

The gate pads 122 are formed in a gate pad region G/P, which is along the first edge of the pad region 111b and the data pads 125 are formed in a data pad region D/P, which is along third edge of the pad region 111b that is between the first edge of the pad region 111b and the second edge of the pad region 111b opposite to the first edge of the pad region 111b. The first common electrode 127a can be formed along the first edge of the pad region 111b. The first common electrode 127a is formed in a different layer from the gate lines 112 and is electrically connected with the common lines 117 via first contact holes 130. The second common electrode 127b along the second edge of the pad region 111b is in the same layer as the gate lines. More specifically, the common electrodes 127a and 127b are formed in pad regions along edges of the active region, excluding the data pad region D/P. The common lines 117 are formed in the same layer as the gate lines 112, and the second common electrode 127b is integrally connected to all of the common lines 117.

The $V_{com}$ distortion preventing electrode 129 overlaps an upper surface of the second common electrode 127b. The $V_{com}$ distortion preventing electrode 129 is in the same layer as the data lines 115. The $V_{com}$ distortion preventing electrode 129 is electrically connected with the dummy line 128 via the second contact holes 132 so as to electrically connect to the dummy pads 144, which are grounded.

If the dummy line 128 and the dummy pads 144 are in the same layer as the gate lines as described above, the dummy line 128 is contacted with the $V_{com}$ distortion preventing electrode via the second contact holes 132. Alternatively, if the dummy line 128 is in the same layer as the data lines, the dummy line 128 can be integrally formed with the $V_{com}$ distortion preventing electrode. As such, if the $V_{com}$ distortion preventing electrode 129 is in the same layer as the data lines, and the second common electrode 127b in the same layer as the gate lines is overlapped by the $V_{com}$ distortion preventing electrode 129, the gate insulation layer 113 is sandwiched between the second common electrode 127b and the $V_{com}$ distortion preventing electrode 129, thereby generating capacitance ('Cap' in FIG. 4) to prevent distortion of a $V_{com}$ signal.

When the $V_{com}$ distortion preventing electrode 129 is grounded, and the $V_{com}$ signal flows to the second common electrode 127b overlapped therewith, and if the $V_{com}$ signal receives an AC distortion from the data lines, the distortion flows to the $V_{com}$ distortion preventing electrode 129. As a result, the distortion flows to the ground and leaves only the $V_{com}$ signal, thereby preventing the distortion of the $V_{com}$ signal.

Figure 5:
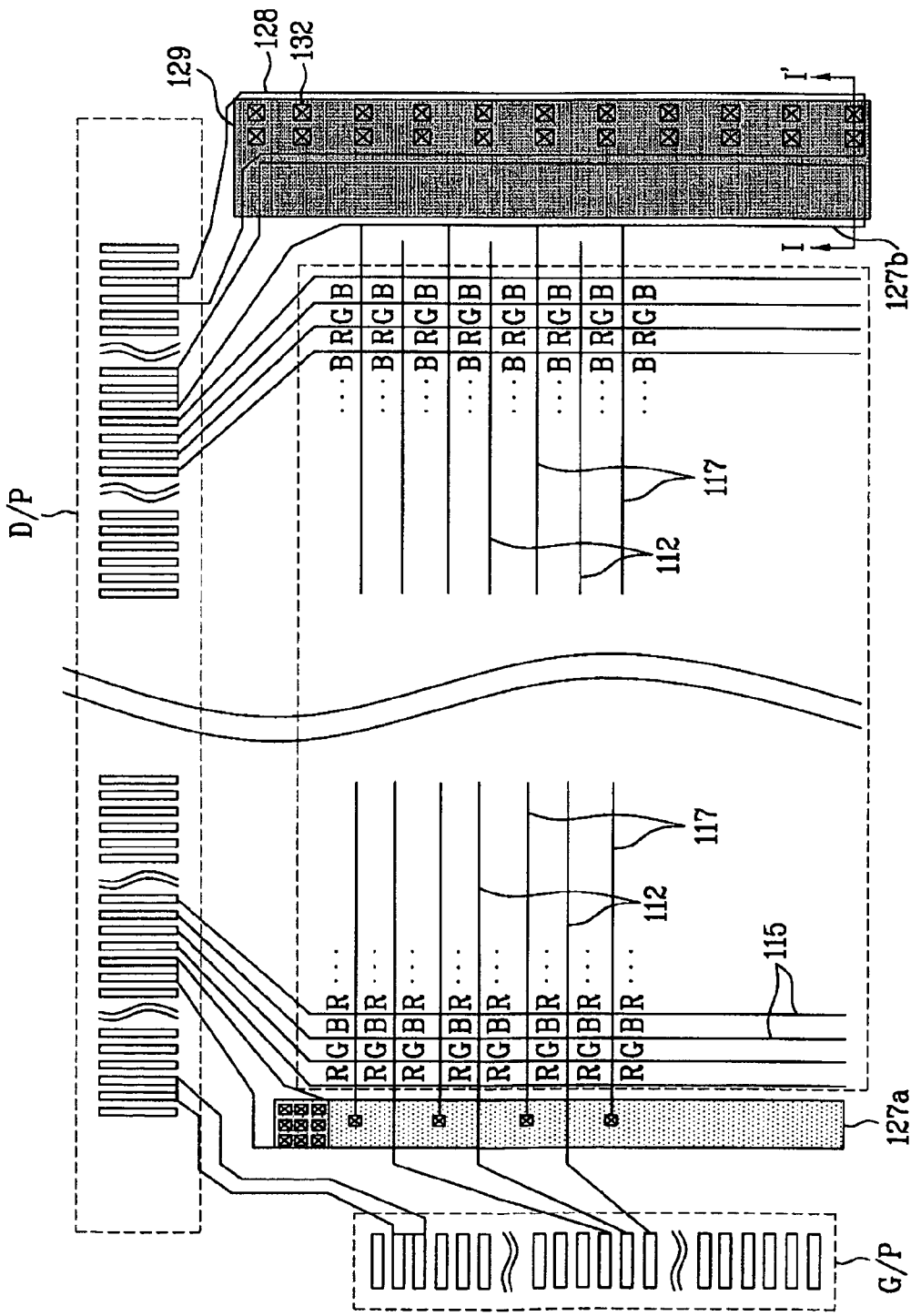
FIG. 5 is a plan view illustrating a pad region of a liquid crystal display device in accordance with a second embodiment of the present invention.

Meanwhile, as shown in FIG. 5, the second common electrode 127b may be formed in the same layer as the gate lines 112 and integrally connected with the common line 117. And, the $V_{com}$ distortion preventing electrode 129 may be formed in the same layer as the pixel electrode (137 of FIG. 4), electrically connected with the dummy line 128 via the second contact hole 132, and overlap the second common electrode 127b. Therefore, the gate insulation layer (113 of FIG. 4) and passivation layer (116 of FIG. 4) are sandwiched between the second common electrode 127b and the $V_{com}$ distortion preventing electrode 129, thereby generating capacitance to prevent distortion of a $V_{com}$ signal.

Figure 6:
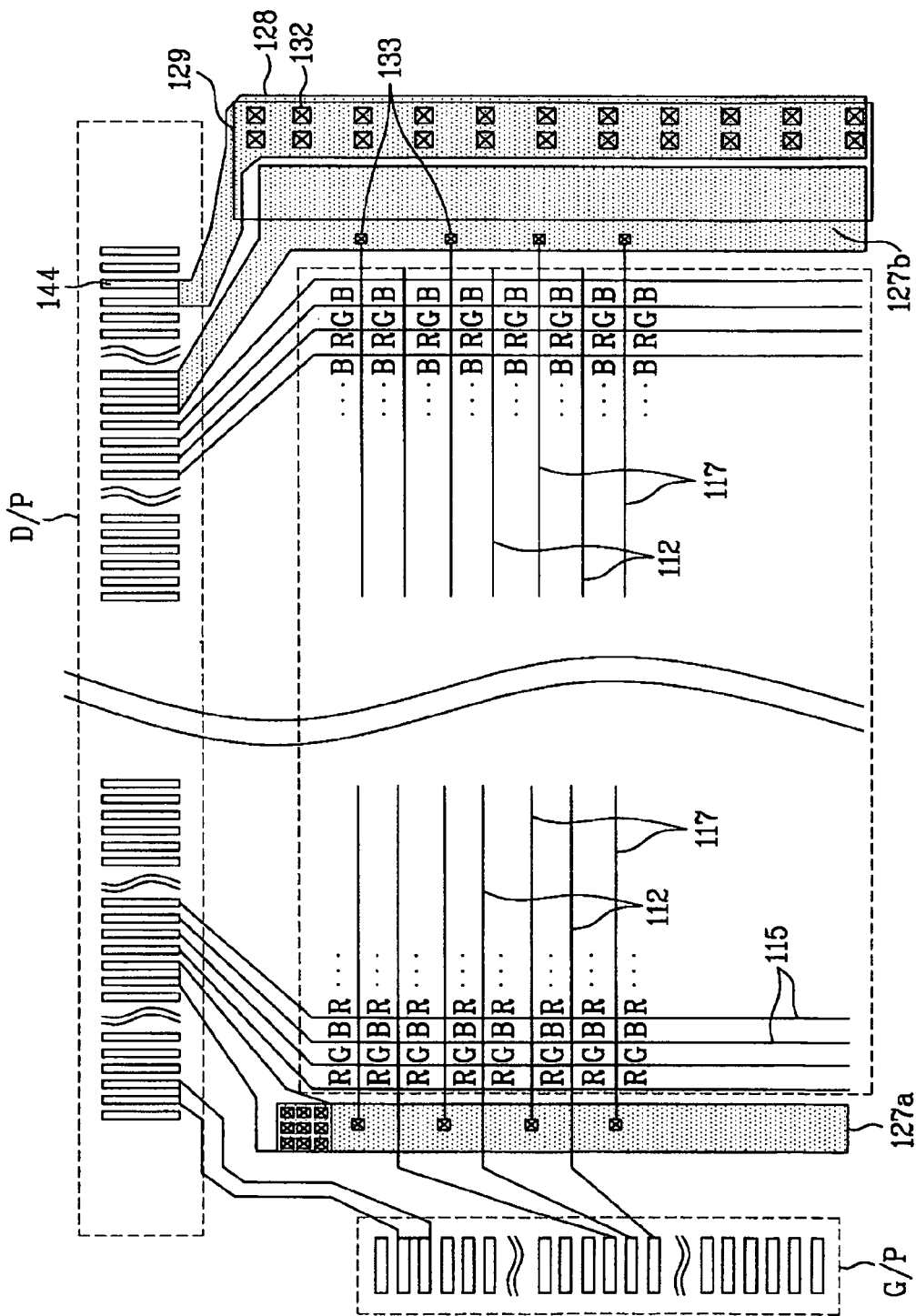
FIG. 6 is a plan view illustrating a pad region of a liquid crystal display device in accordance with a third embodiment of the present invention.

Additionally, as shown in FIG. 6, the second common electrode 127b may be formed in the same layer as the data lines 115 and electrically connected with the common line 117 via an third contact hole 133. And, the $V_{com}$ distortion preventing electrode 129 may be formed in the same layer as the gate lines 112, electrically connected with the dummy line 128 via the second contact hole 132, and overlap the second common electrode 127b. Therefore, the gate insulation layer (113 of FIG. 4) is sandwiched between the second common electrode 127b and the $V_{com}$ distortion preventing electrode 129, thereby generating capacitance to prevent distortion of a $V_{com}$ signal. At this time, the gate or common lines 112 or 117 and the $V_{com}$ distortion preventing electrode 129 are formed separately not to be shorted with each other.

Figure 7:
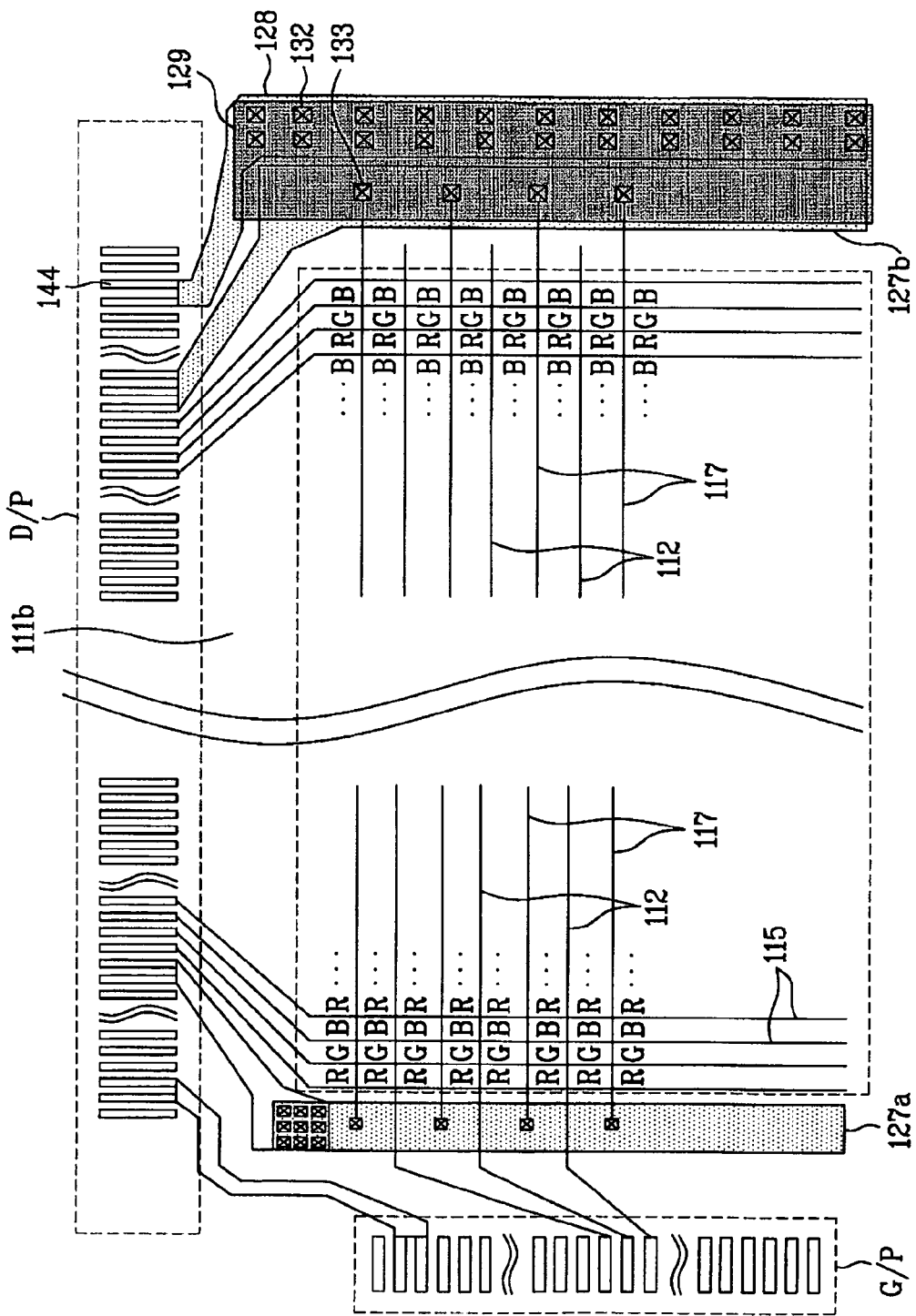
FIG. 7 is a plan view illustrating a pad region of a liquid crystal display device in accordance with a fourth embodiment of the present invention.

And, as shown in FIG. 7, the second common electrode 127b may be formed in the same layer as the data lines 115 and electrically connected with the common line 117 via an third contact hole 133. And, the $V_{com}$ distortion preventing electrode 129 may be formed in the same layer as the pixel electrode (137 of FIG. 4), electrically connected with the dummy line 128 via the second contact hole 132, and overlap the second common electrode 127b. Therefore, the passivation layer (116 of FIG. 4) is sandwiched between the second common electrode 127b and the $V_{com}$ distortion preventing electrode 129, thereby generating capacitance to prevent distortion of a $V_{com}$ signal.

In FIGS. 3, 5, 6 and 7, TFT array substrate may be further comprise an additional $V_{com}$ distortion preventing electrode (not shown), wherein the additional $V_{com}$ distortion preventing electrode may be formed in the same layer as the pixel electrode and overlap the first common electrode 127a with the passivation layer interposed therebetween to form an additional capacitance between the additional $V_{com}$ distortion preventing electrode and the first common electrode. At this time, the first common electrode is formed in the same layer as the data lines and on the first edges of the pad region as described above. And, the additional $V_{com}$ distortion preventing electrode is applied with an ground voltage via an additional dummy pattern connected with the additional $V_{com}$ distortion preventing electrode.

In case that the gate pads are first edge of the pad region and the data pads are third edge of the pad region as above, the second common electrode can be formed on the edges of the pad region including the second edge opposite to the first edge and a fourth edge opposite to the third edge excluding the first edge of the pad region in contrast with the first, second, third and fourth embodiment. At this time, the $V_{com}$ distortion preventing electrode can be in the same layer as the gate lines or the pixel electrode, thereby forming capacitance between the second common electrode and the $v_{com}$ distortion preventing electrode. Alternatively, when the $v_{com}$ distortion preventing electrode is in the same layer as the data lines, the second common electrode can be in the same layer as the gate lines or the pixel electrode.

The above description describes first to fourth embodiment in which the gate pad region G/P is formed only along the first edge of the active region. However, embodiments of the present invention are not limited to this embodiment. For example, when gate pad regions G/P1 and G/P2 are respectively on the first and second edges of the pad region, there is another embodiment of the present invention for preventing ripple in the $V_{com}$ signal.

Figure 8:
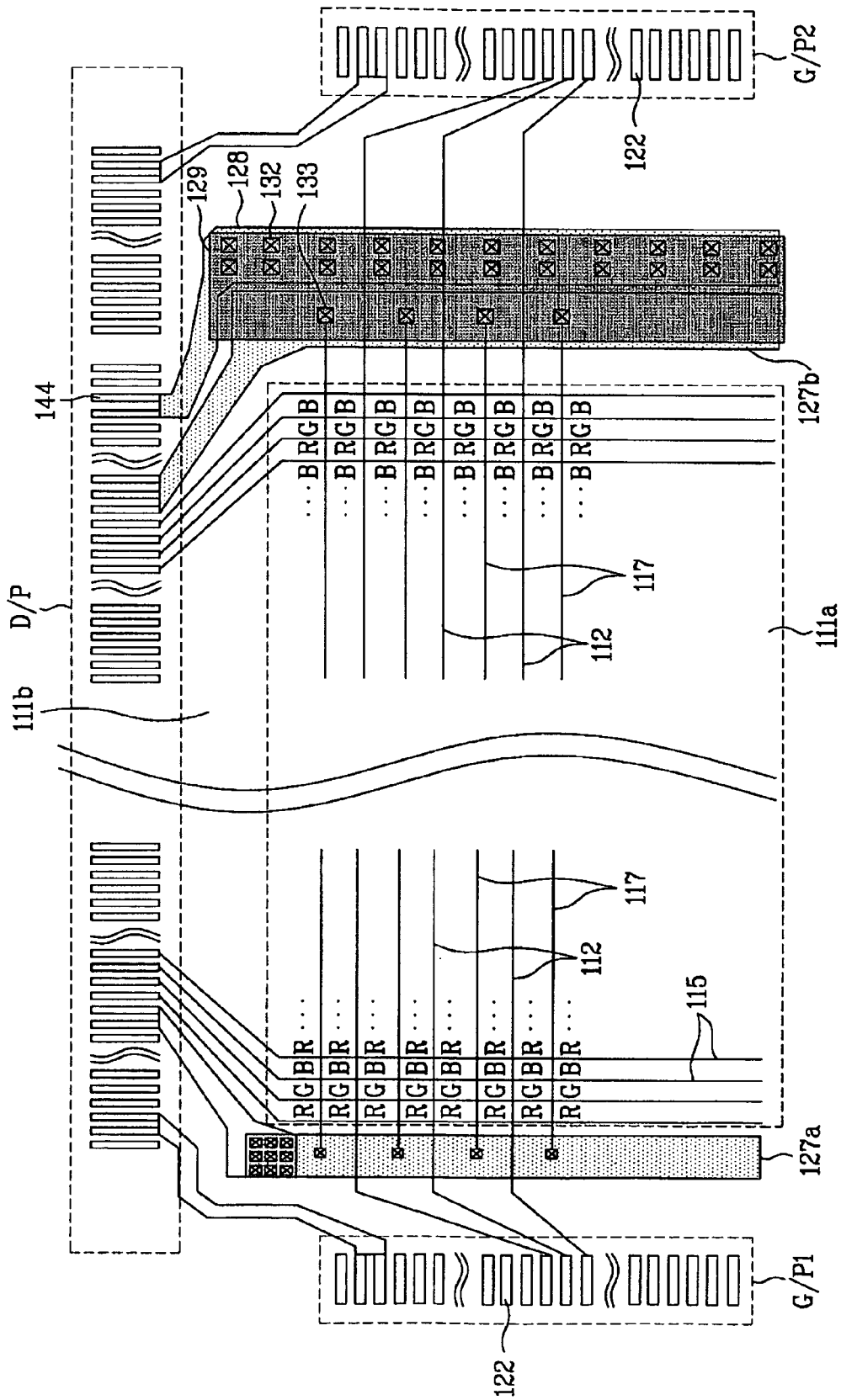
FIG. 8 is a plan view illustrating a pad region of a liquid crystal display device in accordance with a fifth embodiment of the present invention.

As shown in FIG. 8, the pad region 111b of the fifth embodiment can include two gate pad regions G/P1 and G/P2, wherein the respective pad region comprise a plurality of gate pads 122. The gate pads 122 are connected integrally with gate lines 112, thereby the respective gate line is applied with a sane signal from two gate pad regions G/P1 and G/P2. In this case, both the first and the second common electrodes 127a and 127b are in the same layer as the data lines 115, and the $v_{com}$ distortion preventing electrodes 129 overlapping the second common electrodes 127a is in the same layer as the pixel electrode, thereby forming capacitance between the second common electrodes 127b and the $v_{com}$ distortion preventing electrodes 129. The $v_{com}$ distortion preventing electrodes 129 is applied with the ground voltage via dummy line 128 and dummy pattern 144. Additionally, an additional $V_{com}$ distortion preventing electrodes (not shown) can be further formed over the first common electrode 127a to form an additional capacitance, wherein the additional $V_{com}$ distortion preventing electrodes is applied with a ground voltage and formed in the same layer as the pixel electrode.

Although the above description has been described only to the embodiments which constitute the capacitance for causing the distortion of a $v_{com}$ signal to flow to the ground, it is possible to stabilize the $V_{com}$ signal by lowering the resistance in the common electrodes through which a $v_{com}$ signal flows. Thus, a $v_{com}$ distortion preventing electrode can be directly formed on the common electrodes exposed externally through openings, which are formed by removing a portion of an insulation layer over the common electrode.

Figure 9:
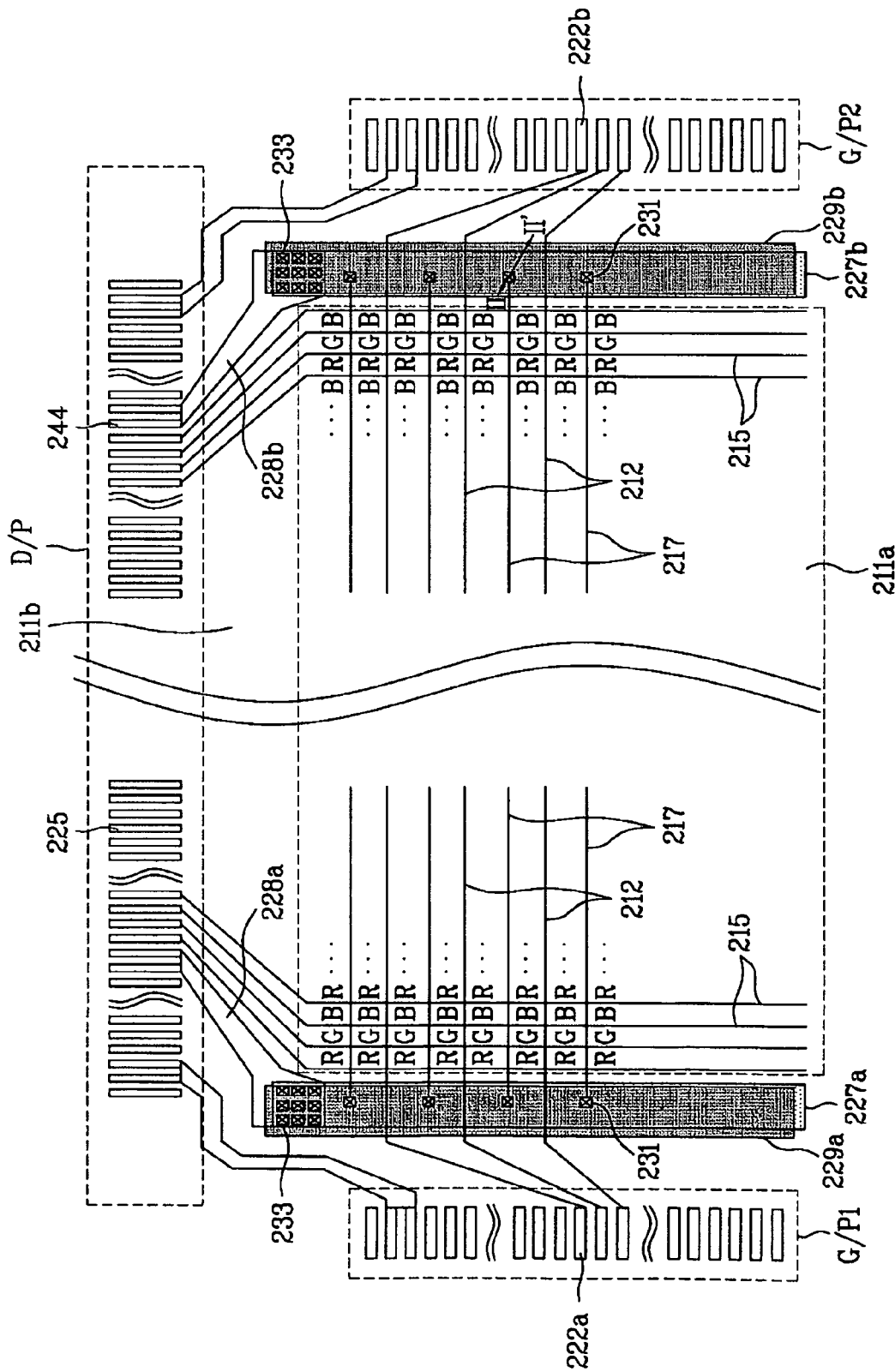
FIG. 9 is a plan view illustrating a pad region of a liquid crystal display device in accordance with a sixth embodiment of the present invention.
Figure 10:
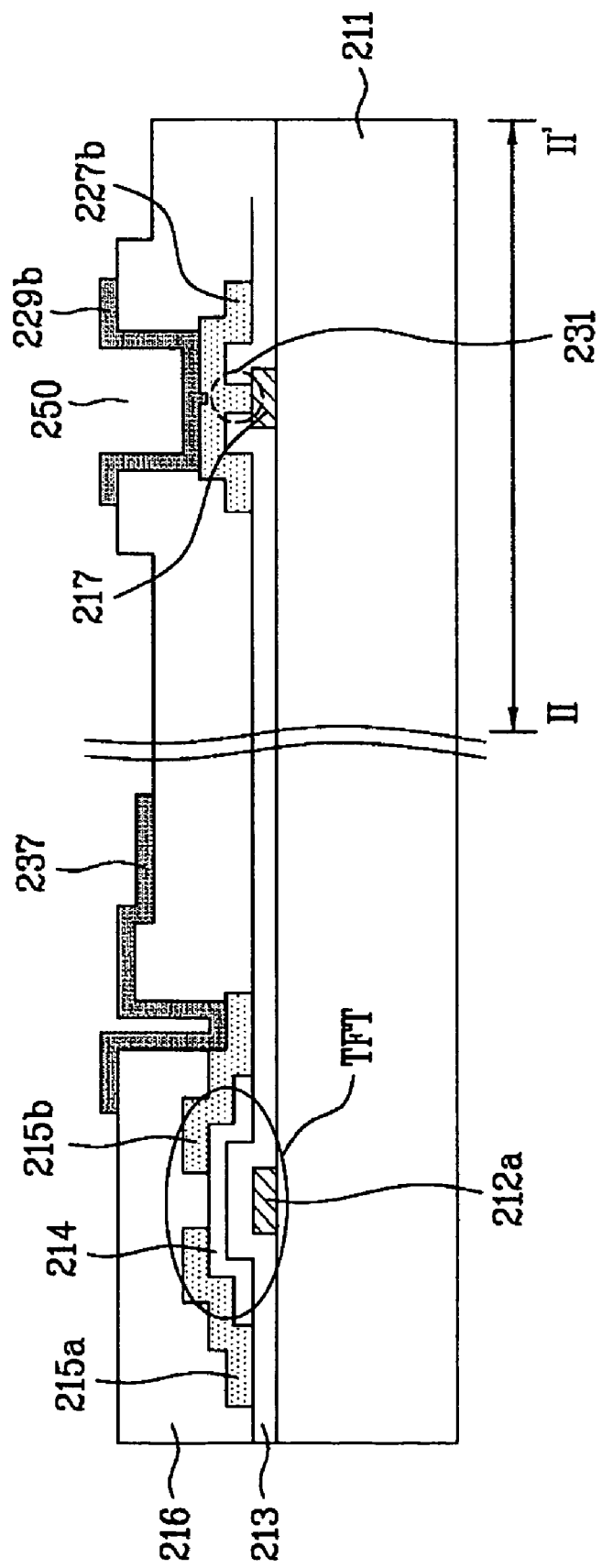
FIG. 10 is a cross-sectional view taken along line II-II' of FIG. 9.
Figure 11:
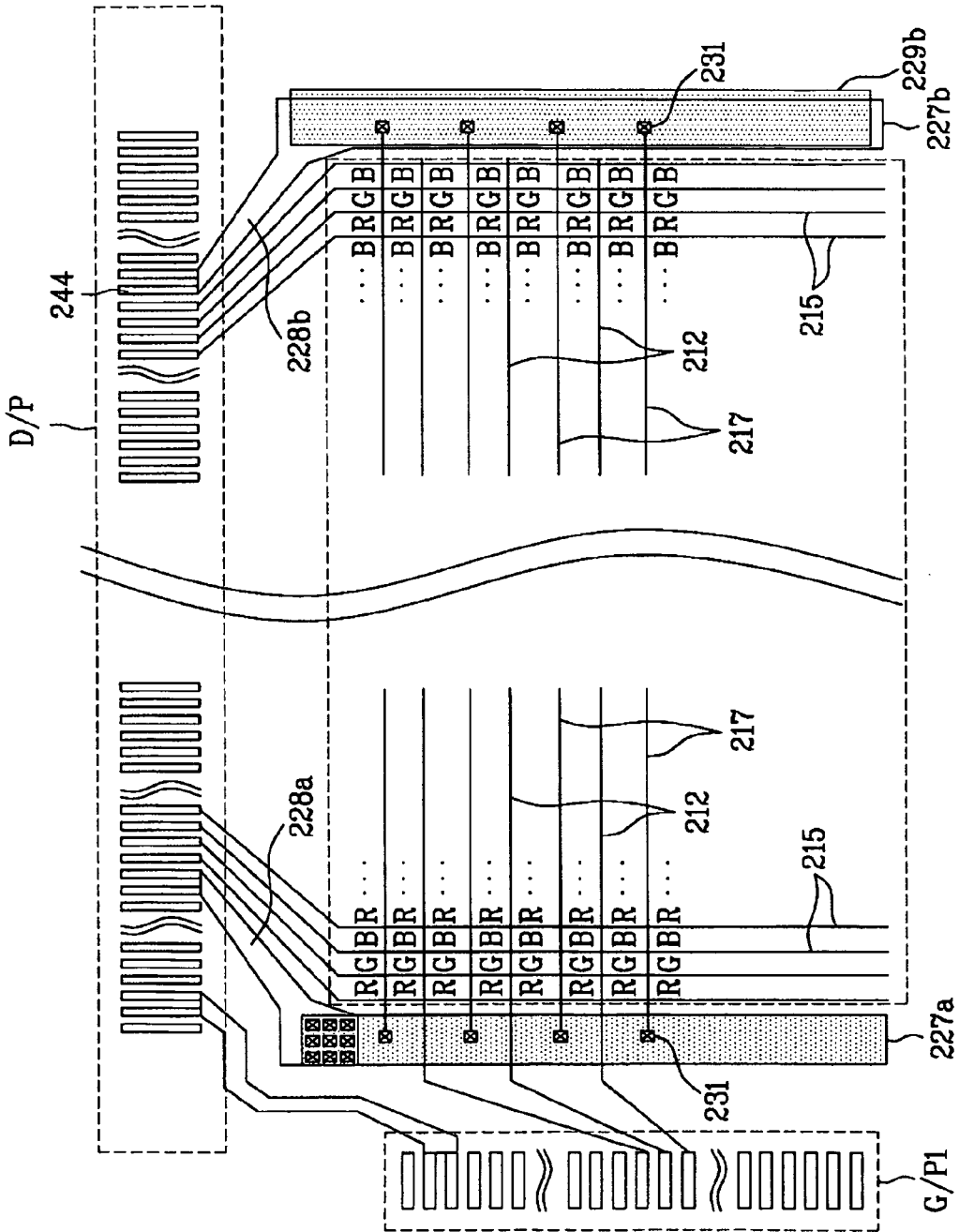
FIG. 11 is a plan view illustrating a pad region of a liquid crystal display device in accordance with a seventh embodiment of the present invention.
Figure 12:
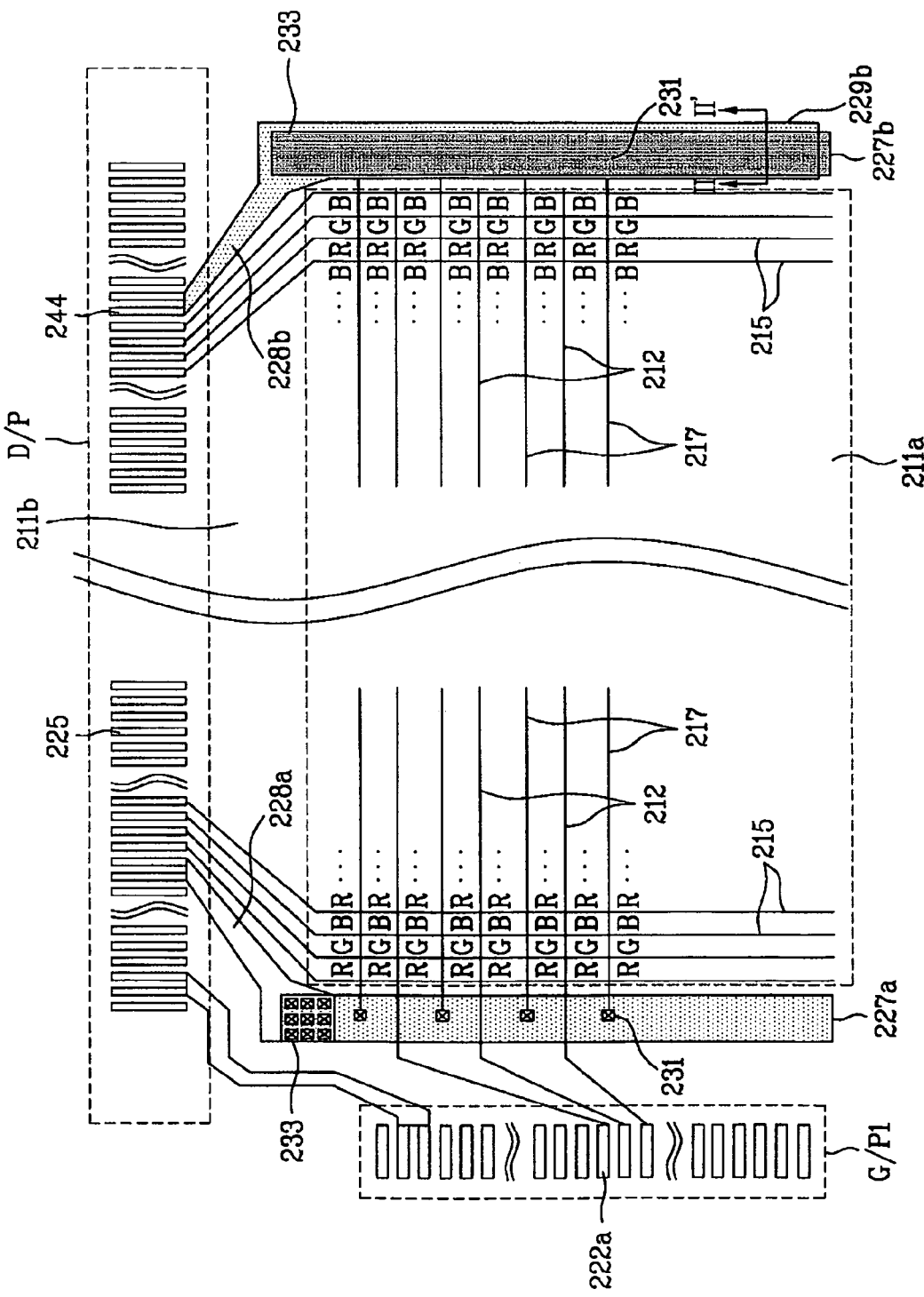
FIG. 12 is a plan view illustrating a pad region of a liquid crystal display device in accordance with a eighth embodiment of the present invention.

FIG. 9 is a plan view illustrating a pad region of a liquid crystal display device in accordance with a sixth embodiment of the present invention, and FIG. 10 is a cross-sectional view taken along line II-II' of FIG. 9. FIG. 11 is a plan view illustrating a pad region of a liquid crystal display device in accordance with a seventh embodiment of the present invention, and FIG. 12 is a plan view illustrating a pad region of a liquid crystal display device in accordance with a eighth embodiment of the present invention.

As shown in FIGS. 9 and 10, an active region 211a has a plurality of gate lines 212 and a plurality of data lines 215 crossing each other to define pixels of red (R), green (G) and blue (B). Each of the pixels includes a thin film transistor (TFT) acting as a switching element, a pixel electrode 237 penetrating a passivation layer 216 and contacting a drain electrode 215b of the thin film transistor, and common lines 217 in the same layer as the gate lines. The common lines 217 are parallel to the gate lines 212. A gate insulation layer 213 is between a gate lines layer and a data lines layer. Since the common lines 217 are in the same layer as the gate lines, the gate insulation layer 213 is also on the common lines 217.

The pad region 211b is provided with a gate pad region G/P having a plurality of gate pads 222 extending from the gate lines 212, a data pad region D/P having a plurality of data pads 225 extending from the data lines 215, a common electrode 227 connected to the common lines and along at least one of the edges of the active region 211a, excluding the edge having the data pad region D/P, and a $v_{com}$ distortion preventing electrode 229 contacting along the common electrode to reduce resistance when a $v_{com}$ signal flows therethrough. For example, the gate pads, common electrodes and $v_{com}$ distortion preventing electrodes are formed on opposite edges of the pad region, and the data pads are formed along another edge of the active region 111a where the gate pads are not formed. As shown in FIG. 9, the pad region 211b can include a first common electrode 227a and a second common electrode 227b connected to the common lines 217 in two gate pad regions G/P1 and G/P2. A first $V_{com}$ distortion preventing electrode 229a and a second $v_{com}$ distortion preventing electrodes 229b are respectively contacting along the first common electrode 227a and the second common electrode 227b.

The common electrodes 227a and 227b provided between the gate pad regions G/P1 and G/P2 and the active region are in the same layer as the data lines. The gate insulation layer 213 is between the common lines 217 and the common electrode 227, but the common lines 217 and the common electrodes 227a and 227b are electrically connected via first contact holes 231 formed by removing a portion of the gate insulation layer.

The pad region 211b also includes additional common electrodes 228a and 228b for a connection to an exterior driving circuit to apply a $V_{com}$ signal to the common electrodes 227a and 227b. Since the additional common electrodes 228a and 228b are in the same layer as the gate lines 212, the additional common electrodes 228a and 228b and the common electrodes 227a and 227b are electrically connected via second contact holes 233 formed by removing portions of the gate insulation layer 213.

The passivation layer 216 is formed over the data lines 215 and the common electrodes 227a and 227b such that the $V_{com}$ distortion preventing electrodes 229a and 229b are directly formed on the common electrodes 227a and 227b through openings (250 of FIG. 10) in the passivation layer 216 formed by removing a portion of the passivation layer over the common electrodes 227a and 227b. The openings 250 are simultaneously formed during a process of forming contact holes through which the pixel electrode 237 contacts the drain electrode. The $v_{com}$ distortion preventing electrodes 229a and 229b are in the same layer as the pixel electrode 237. When the $V_{com}$ distortion preventing electrode is formed along the common electrode, the $v_{com}$ signal flows not only through the common electrode, but also through the $v_{com}$ distortion preventing electrode. Thus, resistance against the $v_{com}$ signal is reduced.

The above description is with regard to an embodiment in which the gate pad regions are only on the opposite edges of the substrate. However, it should be noted that the present invention is not limited to this embodiment, and that the present invention can be applied to the embodiment in which a single gate pad region G/P is formed only on one edge of the pad region as shown in FIGS. 11 and 12. Specifically, the present invention can be applied to a case in which the gate pads are defined on first edge of the pad region, and the data pads formed on third edge of the pad region where the gate pads are not formed, and the $v_{com}$ distortion preventing electrode is formed along the second common electrode on second edge of the pad region opposite to the first edge where the gate pads are located. Additionally, in the FIG. 9, it is also possible only to remove the pad region G/P2 in state of remaining other patterns. At this time, the $V_{com}$ distortion preventing electrode in the first edge of the pad region can be removed as shown in FIGS. 11 and 12 or remained as shown in FIG. 9.

In more detail, as shown in FIG. 11, the $V_{com}$ distortion preventing electrode 229b can be formed in the same layer as the data lines 215, and the second common electrode 227b can be formed in the same layer as the gate lines 112 and connected integrally with the common lines 217 and the additional common electrode 228b. In this case, the second common electrode 227b is exposed to the outside via an opening formed by removing a portion of the gate insulation layer above the second common electrode. Then, the $v_{com}$ distortion preventing electrode 229b is contacted directly along the second common electrode 227b through the opening in the gate insulation layer.

Although not shown in FIG. 11, when the $V_{com}$ distortion preventing electrode 229b is formed in the same layer as the data lines 215, the second common electrode may be formed in the same layer as the pixel electrode without forming in the same layer as the gate lines. In this case, the $v_{com}$ distortion preventing electrode is exposed to the outside via an opening formed by removing a portion of the passivation layer above the second common electrode. Then, the $v_{com}$ distortion preventing electrode is contacted along the second common electrode through the opening in the passivation layer. At this time, the second common electrode is applied with a common signal via the $V_{com}$ distortion preventing electrode (229b of FIG. 11) connected with the additional common electrode (228b of FIG. 11) and Meanwhile, as shown in FIG. 12, the $v_{com}$ distortion preventing electrode 229b can be formed in the same layer as the gate lines and connected integrally with the additional common electrode 228b and common lines 217, and the second common electrode 227b can be formed in the same layer as the pixel electrode and connected electrically with the additional common electrode 228b and common lines 217 via the $v_{com}$ distortion preventing electrode 229b. In this case, the $V_{com}$ distortion preventing electrode 229b is exposed to the outside via the opening formed by removing portions of the gate insulation layer and the passivation layer above the second common electrode 227b. Then, the $V_{com}$ distortion preventing electrode 229b is contacted along the second common electrode 227b through the opening in the gate insulation layer and in the passivation layer.

Although not shown in FIG. 12, when the $V_{com}$ distortion preventing electrode 229b is formed in the same layer as the gate lines 212, the second common electrode can be formed in the same layer as the data lines without forming in the same layer as the pixel electrode. In this case, the $v_{com}$ distortion preventing electrode is exposed to the outside via the opening formed by removing a portion of the gate insulation layer above the second common electrode. Then, the $v_{com}$ distortion preventing electrode is contacted along the second common electrode through the opening in the gate insulation layer. At this time, the second common electrode is applied with a common signal via the $v_{com}$ distortion preventing electrode 229b connected with the additional common electrode (228b of FIG. 12).

In the FIGS. 11 and 12, the first common electrode 227a in the first edge of the pad region is in the same layer as the data lines 115 and is connected with the common lines 217 via first contact holes 231. As mentioned above, an additional $v_{com}$ distortion preventing electrode (not show) can be further comprised in the FIGS. 11 and 12 such as the FIG. 9, wherein the additional $V_{com}$ distortion preventing electrode may be contacted directly along the first common electrode 227a through the opening in the gate insulation layer.

As apparent from the above description, the LCD device according to embodiments of the present invention has several advantages. An LCD device having a $v_{com}$ distortion preventing electrode formed above the common electrode of the pad region with the insulation film interposed between the Vcom distortion preventing electrode and the common electrode can realize capacitance to remove voltage ripple in the $v_{com}$ signal. In the alternative, the liquid crystal display device can have an opening formed by removing a portion of the insulation film over the common electrode in the pad region such that the $v_{com}$ distortion preventing electrode can be directly contacted along the common electrode in the opening to reduce resistance against the $v_{com}$ signal and stabilize the $v_{com}$ signal. Thus, flickering, a greenish phenomenon, and the like caused by the ripple of the $V_{com}$ signal can be prevented, thereby enhancing image quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device with a liquid crystal layer disposed between first and second substrates in which the first substrate is divided into an active region and a pad region outside the active region, comprising:
   gate lines and data lines crossing each other to define pixels in the active region of the first substrate;
   a thin film transistor and a pixel electrode in each of the pixels;
   common lines parallel to the gate lines in the active region;
   gate pads in the pad region, the gate pads electrically connected to the gate lines;
   data pads in the pad region, the data pads electrically connected to the data lines;
   at least one common electrode along edges of the pad region and electrically connected with the common lines;
   an insulation film over the common electrode; and
   at least one distortion preventing electrode overlapping the common electrode with the insulation film interposed therebetween for creating a capacitance.

2. The liquid crystal display device according to claim 1, wherein the distortion preventing electrode is grounded.

3. The liquid crystal display device according to claim 2, further comprising a dummy pads in the pad region in which the data pads are located, and a dummy line in parallel to the common electrode,
wherein the distortion preventing electrode is connected with a ground of a printed circuit board via a dummy line to dummy pads.

4. The liquid crystal display device according to claim 1, wherein the gate pads are formed only on one edge of the pad region, and the data pads are formed on another edge of the pad region.

5. The liquid crystal display device according to claim 4, wherein the common electrode comprises a first common electrode is located between the gate pads and the active region and a second common electrode in opposition to the first common electrode.

6. The liquid crystal display device according to claim 5, wherein the common lines are in the same layer as the gate lines, and the first common is in the same layer as the data lines and is connected with the common lines via contact holes.

7. The liquid crystal display device according to claim 6, wherein the distortion preventing electrode is overlapped over the first common electrode and formed in the same layer as the pixel electrode.

8. The liquid crystal display device according to claim 5, wherein the common lines are in the same layer as the gate lines, and the second common electrode is formed integrally with the common lines or connected with the common lines via contact holes.

9. The liquid crystal display device according to claim 8, wherein the distortion preventing electrode is in the same layer as the data lines and the second common electrode is in the same layer as the gate lines.

10. The liquid crystal display device according to claim 8, wherein the distortion preventing electrode is in the same layer as the data lines and the second common electrode is in the same layer as the pixel electrode.

11. The liquid crystal display device according to claim 8, wherein the distortion preventing electrode is in the same layer as the gate lines and the second common electrode is in the same layer as the data lines.

12. The liquid crystal display device according to claim 8, wherein the distortion preventing electrode is in the same layer as the gate lines and the second common electrode is in the same layer as the pixel electrode.

13. The liquid crystal display device according to claim 1, wherein the gate pads are along opposite edges of the pad region and the data pads are along another edge of the pad region.

14. The liquid crystal display device according to claim 13, wherein the common electrode is located between the gate pads and active region.

15. The liquid crystal display device according to claim 14, wherein the common lines are in the same layer as the gate lines, the common electrode is in the same layer as the data lines, and the distortion preventing electrode is in the same layer as the pixel electrode.

16. The liquid crystal display device according to claim 15, wherein the distortion preventing electrode is overlapped over the common electrode along opposite edges or one edge of the pad region which the gate pads are located.

17. A liquid crystal display device with a liquid crystal layer disposed between first and second substrates in which the first substrate is divided into an active region and a pad region outside the active region, comprising:

gate lines and data lines crossing each other to define pixels in the active region of the first substrate;
a thin film transistor and a pixel electrode in each of the pixels;
common lines parallel to the gate lines in the active region;
gate pads in the pad region, the gate pads electrically connected to the gate lines;
data pads in the pad region, the data pads electrically connected to the data lines;
at least one common electrode along edges of the pad region and electrically connected with the common lines; and
at least one distortion preventing electrode contacting along the common electrode.

18. The liquid crystal display device according to claim 17, wherein the gate pads are formed only on one edge of the pad region, and the data pads are formed on another edge of the pad region.

19. The liquid crystal display device according to claim 18, wherein the common electrode comprises a first common electrode between the gate pads and the active region and a second common electrode in opposition to the first common electrode.

20. The liquid crystal display device according to claim 19, wherein the common lines are in the same layer as the gate lines, the first common electrode is in the same layer as the data lines and is connected with the common lines via contact holes, and the distortion preventing electrode is formed in the same layer as the pixel electrode.

21. The liquid crystal display device according to claim 20, further comprising a passivation layer between the first common electrode and the distortion preventing electrode, the passivation layer having an opening in which the distortion preventing electrode contacts the first common electrode.

22. The liquid crystal display device according to claim 19, wherein the common lines are in the same layer as the gate lines, and the second common electrode is formed integrally with the common lines or connected with the common lines via contact holes.

23. The liquid crystal display device according to claim 22, wherein the distortion preventing electrode is in the same layer as the data lines and the second common electrode is in the same layer as the gate lines.

24. The liquid crystal display device according to claim 23, further comprising:
a gate insulation layer between the second common electrode and the distortion preventing electrode, the gate insulation layer having an opening in which the distortion preventing electrode contacts the second common electrode.

25. The liquid crystal display device according to claim 22, wherein the distortion preventing electrode is in the same layer as the data lines and the second common electrode is in the same layer as the pixel electrode.

26. The liquid crystal display device according to claim 25, further comprising:
a passivation layer between the second common electrode and the distortion preventing electrode, the passivation layer having an opening in which the distortion preventing electrode contacts the second common electrode.

27. The liquid crystal display device according to claim 22, wherein the distortion preventing electrode is in the same layer as the gate lines and the second common electrode is in the same layer as the data lines.

28. The liquid crystal display device according to claim 27, further comprising:

a gate insulation layer between the second common electrode and the distortion preventing electrode, the gate insulation layer having an opening in which the distortion preventing electrode contacts the second common electrode.

29. The liquid crystal display device according to claim 22, wherein the distortion preventing electrode is formed in the same layer as the gate lines and the second common electrode is in the same layer as the pixel electrode.

30. The liquid crystal display device according to claim 29, further comprising:
a gate insulation layer and a passivation layer between the second common electrode and the distortion preventing electrode, both the gate insulation layer and the passivation layer having an opening in which the distortion preventing electrode contacts the second common electrode.

31. The liquid crystal display device according to claim 17, wherein the gate pads are along opposite edges of the pad region, and the data pads are along another edge of the active region.

32. The liquid crystal display device according to claim 31, wherein the common electrode is located between the gate pads and active region.

33. The liquid crystal display device according to claim 32, wherein the common electrode is in the same layer as the data lines and the distortion preventing electrode is in the same layer as the pixel electrode.

34. The liquid crystal display device according to claim 33, further comprising:
a passivation layer between the common electrode and the distortion preventing electrode, the passivation layer having an opening in which the distortion preventing electrode contacts the common electrode.

35. The liquid crystal display device according to claim 34, wherein the distortion preventing electrode contacts the common electrode via the opening along opposite edges or one edge of the pad region which the gate pads are located.

36. A method of fabricating a liquid crystal display device with a liquid crystal layer disposed between first and second substrates in which the first substrate is divided into an active region and a pad region outside the active region, comprising:
forming gate lines and data lines crossing each other to define pixels in the active region of the first substrate;
forming a thin film transistor and a pixel electrode in each of the pixels;
forming common lines parallel to the gate lines in the active region;
forming gate pads in the pad region, the gate pads electrically connected to the gate lines;
forming data pads in the pad region, the data pads electrically connected to the data lines;
forming at least one common electrode along edges of the active region and electrically connected with the common lines;
forming an insulation film over the common electrode; and
forming at least one distortion preventing electrode overlapping the common electrode with the insulation film interposed therebetween for creating a capacitance.

37. The method of fabricating a liquid crystal device according to the claim 36, further comprising the step of forming dummy pads in the pad region, wherein the dummy pads electrically connect with the ground and connected to the distortion preventing electrode therebetween.

38. A method of forming a liquid crystal display device with a liquid crystal layer disposed between first and second substrates in which the first substrate is divided into an active region and a pad region outside the active region, comprising:
forming gate lines and data lines crossing each other to define pixels in the active region of the first substrate;
forming a thin film transistor and a pixel electrode in each of the pixels;
forming common lines parallel to the gate lines in the active region;
forming gate pads in the pad region, the gate pads electrically connected to the gate lines;
forming data pads in the pad region, the data pads electrically connected to the data lines;
forming at least one common electrode along edges of the active region and electrically connected with the common lines; and
forming at least one distortion preventing electrode contacting along the common electrode.

39. The liquid crystal display device according to claim 38, further comprising:
a insulation film between the common electrode and the distortion preventing electrode, the insulation film having an opening in which the distortion preventing electrode contacts the common electrode.

* * * * *